(12) United States Patent
Charugundla Gangadhar et al.

(10) Patent No.: US 11,347,974 B2
(45) Date of Patent: May 31, 2022

(54) AUTOMATED SYSTEM FOR DETERMINING PERFORMANCE OF VEHICULAR VISION SYSTEMS

(71) Applicant: Magna Electronics Inc., Auburn Hills, MI (US)

(72) Inventors: Sai Sunil Charugundla Gangadhar, Rochester Hills, MI (US); Navdeep Singh, Sterling Heights, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/947,845

(22) Filed: Aug. 20, 2020

(65) Prior Publication Data

US 2021/0056356 A1 Feb. 25, 2021

Related U.S. Application Data

(60) Provisional application No. 62/889,174, filed on Aug. 20, 2019.

(51) Int. Cl.
*G06K 9/62* (2022.01)
*G06V 20/56* (2022.01)
(52) U.S. Cl.
CPC ......... *G06K 9/6262* (2013.01); *G06K 9/6256* (2013.01); *G06V 20/56* (2022.01)
(58) Field of Classification Search
None
See application file for complete search history.

(56) References Cited

U.S. PATENT DOCUMENTS

| 5,550,677 | A | 8/1996 | Schofield et al. |
|---|---|---|---|
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 10,071,687 | B2 | 9/2018 | Ihlenburg et al. |
| 10,099,614 | B2 | 10/2018 | Diessner |
| 10,215,799 | B2 | 2/2019 | Douglas et al. |
| 10,368,063 | B2 | 7/2019 | Lehmann et al. |
| 10,635,914 | B2 | 4/2020 | Sesti et al. |
| 10,841,571 | B2 | 11/2020 | Sigle |
| 10,870,400 | B2 | 12/2020 | Thomas et al. |
| 11,012,684 | B2 | 5/2021 | Sesti et al. |

(Continued)

*Primary Examiner* — Leon Flores
(74) *Attorney, Agent, or Firm* — Honigman LLP

(57) ABSTRACT

A method for automating performance evaluation of a test object detection system includes providing at least one frame of image data to the test object detection system, processing the image data via an image processor of the test object detection system, and receiving, from the test object detection system, a list of objects detected by the test object detection system in the at least one frame of image data. The frame of image data is provided to a validation object detection system, and a list of objects detected by the validation object detection system is received from the validation object detection system. The list of objects detected by the test object detection system is compared to the list of objects detected by the validation object detection system and discrepancies are determined between the lists. The determined discrepancies between the lists of objects detected are reported.

21 Claims, 9 Drawing Sheets

(56) References Cited

U.S. PATENT DOCUMENTS

| | | |
|---|---|---|
| 2019/0138432 A1 | 5/2019 | Nagaraj et al. |
| 2019/0221121 A1* | 7/2019 | Guo .......................... G08G 1/20 |
| 2020/0256951 A1 | 8/2020 | Kunkel |
| 2021/0142073 A1 | 5/2021 | Ustunel |
| 2021/0201056 A1 | 7/2021 | Potnis |
| 2021/0201085 A1 | 7/2021 | Potnis |

* cited by examiner

| Object Type | Number of detected objects 'Perception supplier A' |
|---|---|
| Car | 1 |
| Bike | 0 |
| Bus | 0 |
| Pedestrian | 4 |

| Object Type | Number of detected objects by 'ACAPE' |
|---|---|
| Car | 2 |
| Bike | 0 |
| Bus | 0 |
| Pedestrian | 6 |

| Frame # | Cars | Motor Cycle | Bicycle | Buses | Pedestrians |
|---|---|---|---|---|---|
| 1 | 6 | 1 | 0 | 1 | 0 |
| 2 | 6 | 0 | 0 | 1 | 0 |
| ... | | | | | |
| 1043 | 3 | 2 | 0 | 0 | 8 |
| 1044 | 3 | 1 | 0 | 0 | 6 |
| 1045 | 2 | 1 | 0 | 0 | 7 |

FIG. 8

| Frame # | Cars | Motor Cycle | Bicycle | Buses | Pedestrians |
|---|---|---|---|---|---|
| 1 | 7 | 0 | 1 | 1 | 0 |
| 2 | 7 | 1 | 0 | 1 | 1 |
| ... | | | | | |
| 1043 | 3 | 2 | 0 | 0 | 8 |
| 1044 | 3 | 2 | 0 | 0 | 7 |
| 1045 | 3 | 2 | 0 | 0 | 7 |

AUTOMATED SYSTEM FOR DETERMINING PERFORMANCE OF VEHICULAR VISION SYSTEMS

CROSS REFERENCE TO RELATED APPLICATION

The present application claims the filing benefits of U.S. provisional application Ser. No. 62/889,174, filed Aug. 20, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a method for automating performance evaluation of vision systems of vehicles. The method includes providing at least one frame of image data to a test object detection system and receiving, from the test object detection system, a list of objects detected by the test object detection system in the at least one frame of image data. The method also includes providing the at least one frame of image data (i.e., the same image data) to a validation object detection system and receiving, from the validation object detection system, a list of objected detected by the validation object detection system in the at least one frame of image data. The method also includes comparing the list of objects detected by the test object detection system and the list of objects detected by the validation object detection system and reporting discrepancies between the list of objects detected by the test object detection system and the list of objects detected by the validation object detection system.

These and other objects, advantages, purposes and features of the present invention will become apparent upon review of the following specification in conjunction with the drawings.

BRIEF DESCRIPTION OF THE DRAWINGS

FIG. 8 is a table of objects classified by the test object detection system; and FIG. 9 is a table of objects classified by the validation object detection system.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
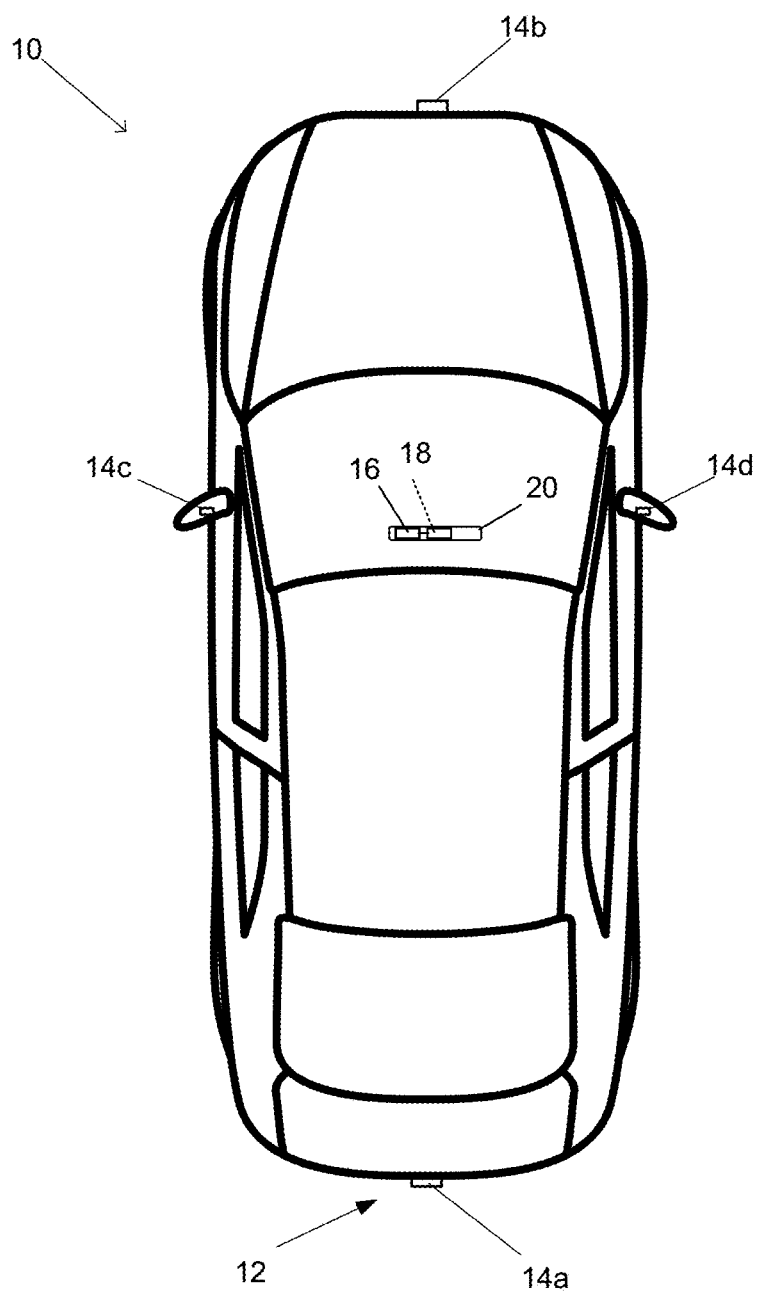
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Autonomous driving is quickly gaining importance in the automotive world, and is likely the future of driving. Cameras play an integral part in autonomous driving. However, a key challenge that remains is the ability to evaluate the performance of different camera algorithms. Currently, there are no automated methods of evaluating and creating performance metrics of "Machine Vision" algorithms. Implementations of the present invention include systems and methods directed toward automated performance evaluation of, for example, machine vision algorithms. The automated performance evaluation system 50 (FIG. 5) or automated camera algorithm performance evaluator (ACAPE) may be used for validation and/or acceptance criteria for perception (e.g., vision or other machine learning) algorithms or object detection systems. An open source tool (e.g., TensorFlow or other suitable tool or program) can be used as a base for the system. The system may automate object detection validation and automate object classification validation. The system automates the validation of the vision system's image processor detection rates. This can be done by keeping a frame to frame count of detected objects, and then comparing the differences between a baseline (such as provided via TensorFlow or the like, which may provide vehicle positions in the frame, such as by pixel coordinates) and the image processor's algorithmic output. The system may also automate validation of the image processor's classification rates. This can be done by keeping a frame to frame count of classified objects, and then comparing the differences between a baseline (such as provided by TensorFlow or the like, which may provide a confidence level for each object that is detected and classified) and the image processor's algorithmic output.

Figure 2:
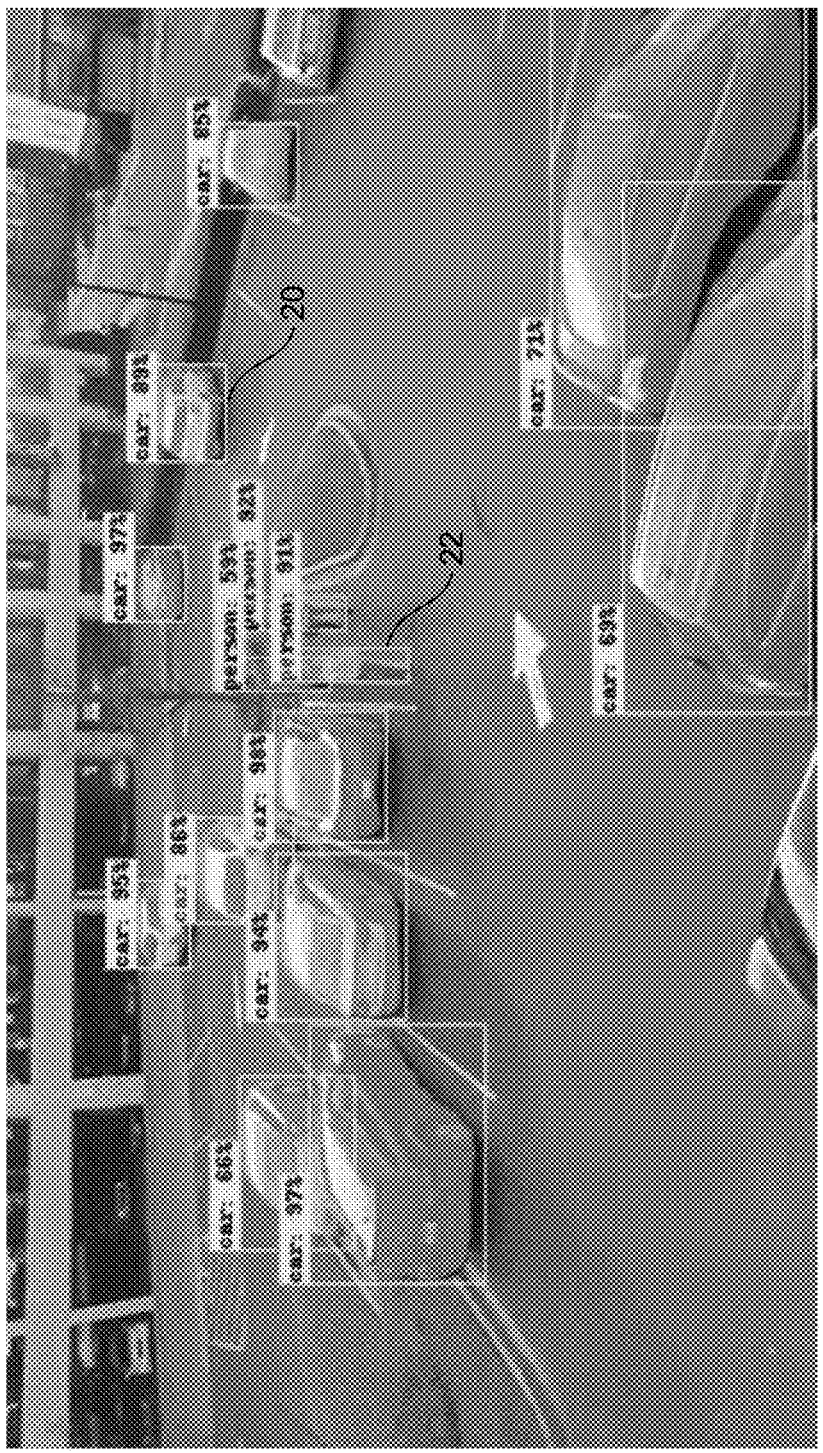
FIG. 2 is a frame of captured image data illustrating confidence levels of detected objects.
Figure 3:
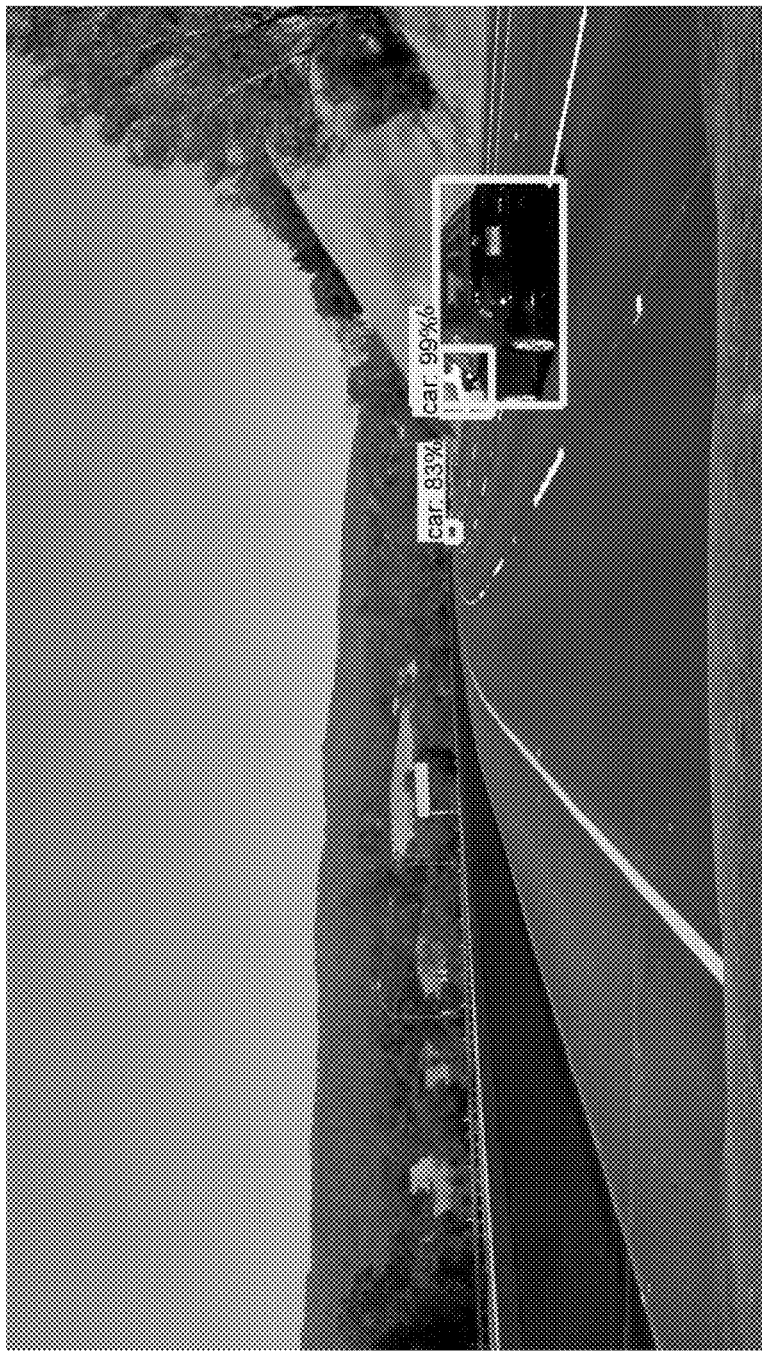
FIG. 3 is another frame of captured image data illustrating confidence levels of detected objects.
Figure 4:
FIG. 4 is another frame of captured image data illustrating confidence levels of detected objects.

The system may include a validation object detection system that provides object position of each detected object (e.g., a vehicle, pedestrian, etc.) in each frame of image data (e.g., pixel coordinates of one or more objects). As illustrated in FIGS. 2-4, the validation object detection system may provide a confidence level for each object that is detected and/or classified. For example, the validation object detection system indicates an object 20 is a vehicle with an 89 percent confidence level (FIG. 2). Each detected object may be placed within a bounding box and include an associated confidence level (FIGS. 2-4). In another example, the validation object detection system indicates an object is a pedestrian with a 91 percent confidence level. In some implementations, the system (including the validation object detection system) may automate validation of detection rates of an object detection system under test (e.g., the object detection system of a vehicle). For example, the system may keep a frame to frame count of detected objects and compare the differences between a validation object detection system (e.g., a "golden" object detection system) and the object detection system under test (i.e., the test object detection system). The validation object detection system may include a current production object detection system and/or object detection performed manually (i.e., scored by human operators). In some examples, the system may automate validation of classification rates by keeping a frame to frame count of classified objects and comparing the differences between the validation object detection system and the test object detection system.

Figure 5:
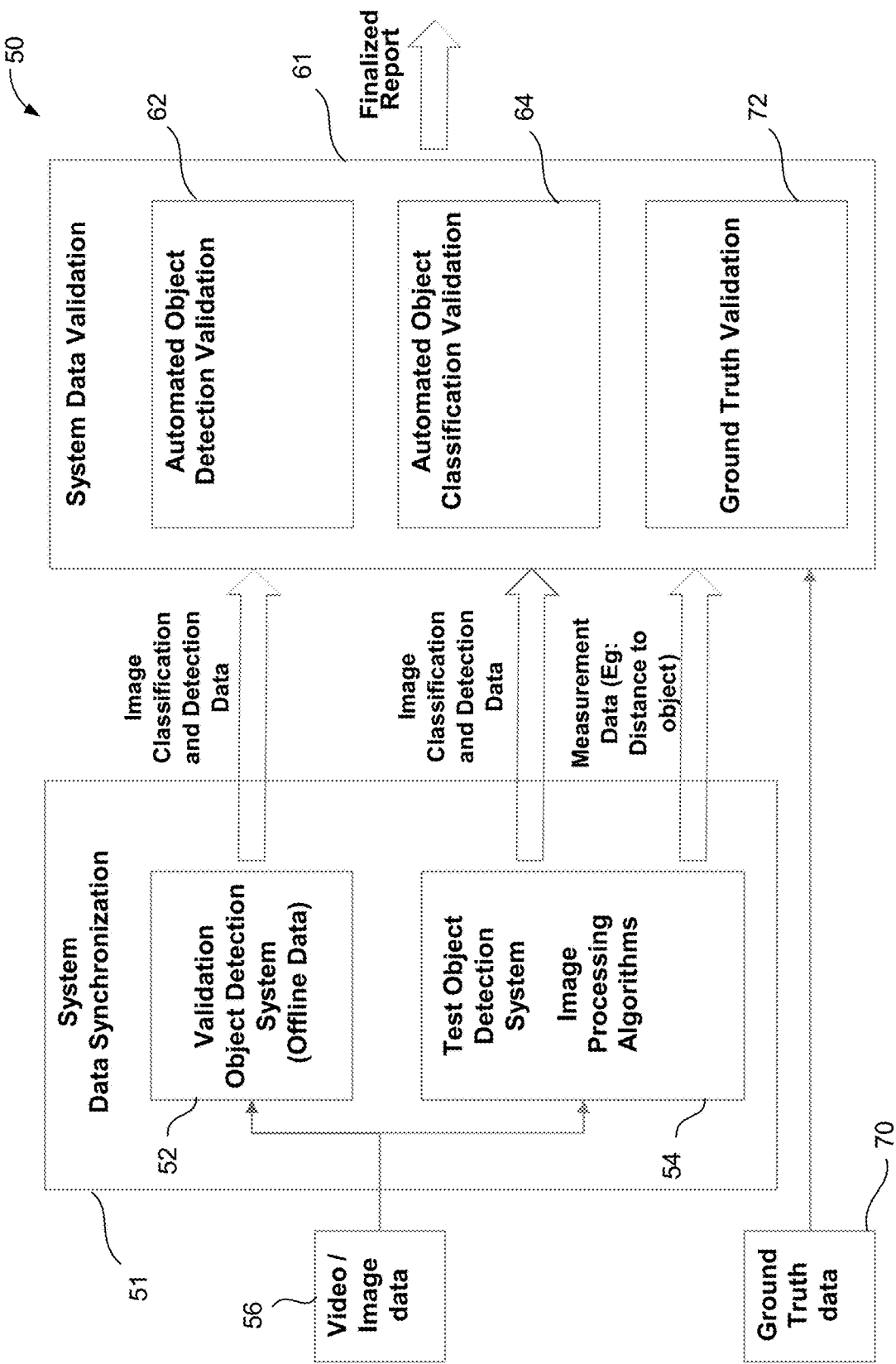
FIG. 5 is a block diagram of an automated performance evaluation system in accordance with the present invention.

Referring now to FIG. 5, the automated performance evaluation system 50 includes a data synchronization module 51 and a data validation module 61. The data synchronization module 51 includes the validation object detection system 52 and the test object detection system 54. Both systems 52, 54 receive the same video/image data 56 and each system 52, 54 outputs image classification and detection data. The image classification and detection data from both systems 52, 54 is synchronized (so that the outputs are associated with the same frame or frames of image data) and is passed to the data validation module 61. The data validation module 61 compares the data and performs automated object detection validation at module 62 and/or automated object classification validation at module 64. Optionally, the test object detection system determines a distance to each detected object. In some implementations, ground truth data 70 is passed to a ground truth validation block 72 of the data validation block 61. The ground truth validation module 72 may use the ground truth data 70 (e.g., image data annotated with ground truth values) to determine an accuracy of the distance measurement to each detected object (as determined via processing of the provided image data by the processor of the test object detection system). For example, the ground truth data 70 may include distance measurements captured by a distance sensor to each object in the image data.

Figures 6A, 6B:
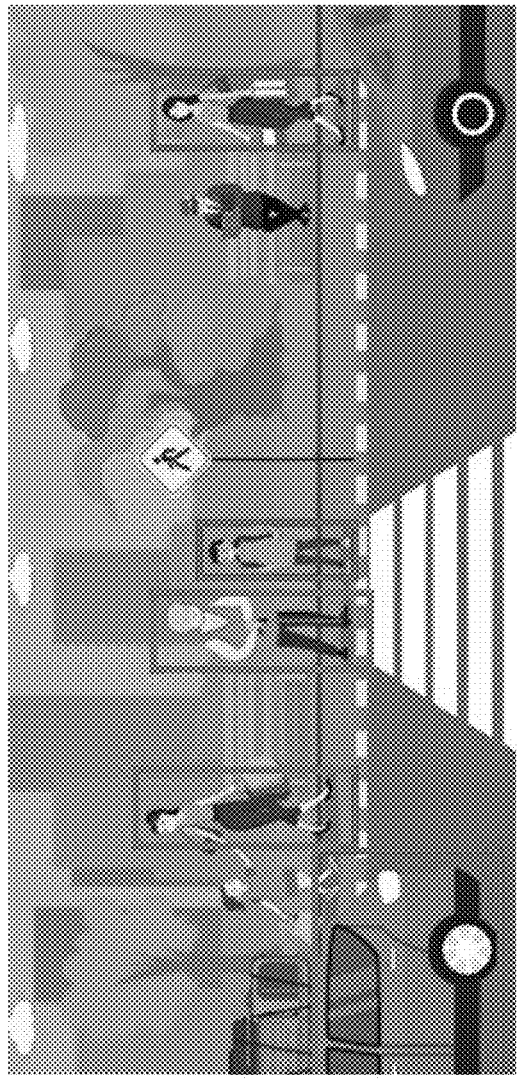
FIG. 6A is a simulated plan view of a frame of image data including objects detected by a test object detection system.
FIG. 6B is a table of the detected objects of FIG. 6A.
Figures 7A, 7B:
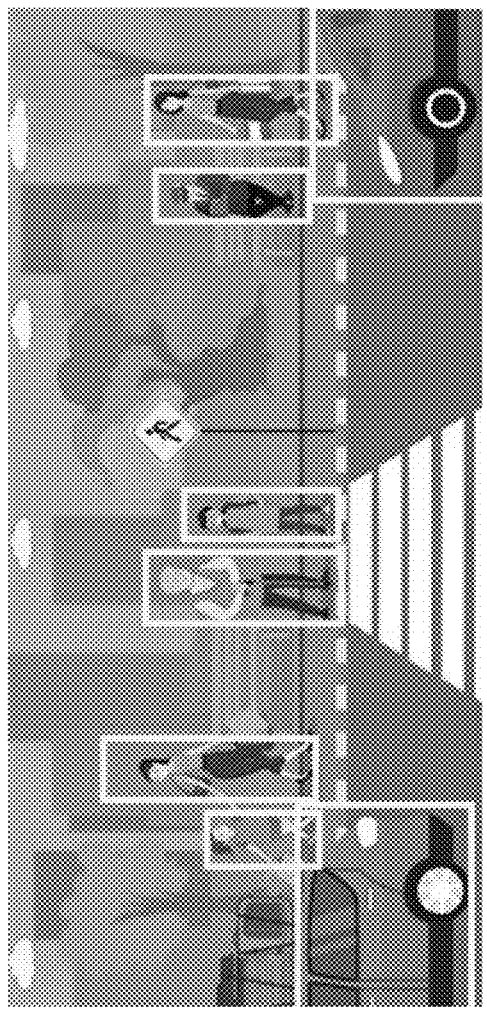
FIG. 7A is the simulated plan view of the frame of image data of FIG. 6A including objects detected by a validation object detection system.
FIG. 7B is a table of the detected objects of FIG. 7A.

Referring now to FIGS. 6A and 6B, the test object detection system 54 may detect a number of objects (e.g., cars, bikes, buses, and pedestrians) in a single frame of image data via processing by the image processor of the image data provided to the system (FIG. 6A). For example, the test object detection system may process the provided image data and detect a single car, zero bikes, zero buses, and four pedestrians (FIG. 6B). Referring now to FIGS. 7A and 7B, using the same frame of image data, the validation object detection system 52 may also detect any number of cars, bikes, buses, and pedestrians (FIG. 7A). For example, the validation object detection system may detect two cars, zero bikes, zero buses, and six pedestrians using the same frame of image data where the test object detection system detected one car, zero bikes, zero buses, and four pedestrians. In this example, the validation object detection system 52 detected one car and two pedestrians that the test object detection system missed. The validation object detection system comprises offline data and may comprise a proven system that accurately processes the same frame or frames of image data and detects objects, or may comprise pre-processed results of the same frame or frames of image data that indicates the objects.

Referring now to FIG. 8, in some examples, the test object detection system may classify a number of objects. For example, the test object detection system may classify an object as a car, a motorcycle, a bicycle, a bus, or a pedestrian. The test object detection system may perform classification on any number of image frames. For example, the test object detection system may classify each object in each successive captured frame of image data.

Referring now to FIG. 9, the validation object detection system may similarly classify objects within a frame of image data (or the classifications of the objects is otherwise provided to the system data validation). In some implementations, the validation object detection system classifies objects using the same frame or frames of image data that the test object detection system processed to perform classification, as previously discussed (FIG. 8). Comparing the results of the test object detection system and the validation object detection system (i.e., comparing the table of FIG. 8 and the table of FIG. 9) may reveal missed classifications or false detections by the test object detection system. In the given example, the test object detection system classified an object as a motorcycle while the validation object detection system classified the same object as a bicycle. Discrepancies such as these may be saved or stored or written to, for example, a test report. Each discrepancy may then be further analyzed (e.g., manually or by other automated systems) on these focused issues as opposed to manually performing the entire comparison analysis.

In some implementations, the validation object detection system includes a neural network. The neural network may be trained on image data for object detection and/or classification. In some examples, the neural network may be trained for specific vehicle and/or road conditions. The validation object detection system may include multiple neural networks, each trained specifically for certain vehicles and/or road conditions and/or weather conditions and the appropriate neural network may be chosen depending on the image data selected for use. For example, when the test image data includes primarily cars during a bright and sunny day, a neural network that trained primarily on test data including cars during sunny days may be selected. The test object detection system may be compared against the outputs of different neural networks, each time with image data that the neural network was trained for. In some examples, the system is used in conjunction with manual (i.e., human) object detection validation.

In some examples, a method for automating performance evaluation of a test object detection system includes providing at least one frame of image data to the test object detection system and receiving, from the test object detection system, a list of objects detected by the test object detection system in the at least one frame of image data. The method may also include providing the at least one frame of image data to a validation object detection system and receiving, from the validation object detection system, a list of objected detected by the validation object detection system in the at least one frame of image data. The method includes comparing the list of objects detected by the test object detection system and the list of objects detected by the validation object detection system to determine discrepancies. The method may include reporting the determined discrepancies between the list of objects detected by the test object detection system and the list of objects detected by the validation object detection system. The system thus provides a test and validation of an image processor for a vehicular vision system to make sure that the processor accurately detects and classifies objects in image data provided to the processor (such as would be provided via a camera at the vehicle in which the processor may be disposed) and to make sure that the processor accurately determines distances to the detected objects. The system automates the validation process and greatly reduces the time that validation engineers will need to spend on determining confirmed and missed and false detections and classifications. If the processor does not detect or classify the objects within a threshold degree of accuracy, the system and processor may be adjusted or trained to better identify objects in subsequent frames of image data provided to the processor.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466;

7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for automating performance evaluation of a test object detection system, the method comprising:
providing at least one frame of image data to the test object detection system;
detecting, via processing of the at least one frame of image data by an image processor of the test object detection system, objects in the at least one frame of image data provided to the test object detection system;
receiving at a validation system, from the test object detection system, a list of the objects detected by the test object detection system in the at least one frame of image data provided to the test object detection system;
providing the at least one frame of image data to a validation object detection system;
detecting, via the validation object detection system, objects in the at least one frame of image data provided to the validation object detection system;
receiving at the validation system, from the validation object detection system, a list of the objects detected by the validation object detection system in the at least one frame of image data provided to the validation object detection system;
comparing via the validation system the list of the objects detected by the test object detection system and the list of the objects detected by the validation object detection system;
determining via the validation system discrepancies between the list of the objects detected by the test object detection system and the list of the objects detected by the validation object detection system;
reporting via the validation system the determined discrepancies between the list of the objects detected by the test object detection system and the list of the objects detected by the validation object detection system;
determining, via processing of the at least one frame of image data by the image processor of the test object detection system, a distance measurement for each detected object;
determining an accuracy of each distance measurement based on ground truth data; and
reporting the determined accuracies of the distance measurements for the respective detected objects.

2. The method of claim 1, wherein reporting the determined discrepancies comprises generating a test report via the validation system.

3. The method of claim 1, wherein the validation object detection system comprises a neural network.

4. The method of claim 1, wherein the validation object detection system comprises a plurality of neural networks.

5. The method of claim 4, wherein each of the plurality of neural networks is trained on different training data.

6. The method of claim 5, wherein at least one of the plurality of neural networks is trained on training data that matches an aspect of the at least one frame of image data, wherein the aspect comprises one selected from the group consisting of (i) a vehicle type, (ii) road conditions and (iii) weather conditions.

7. The method of claim 1, further comprising:
classifying, via processing of the at least one frame of image data by the image processor of the test object detection system, objects detected by the test object detection system in the at least one frame of image data;
receiving at the validation system, from the test object detection system, a list of the classified objects as classified by the test object detection system in the at least one frame of image data;
classifying, via the validation object detection system, objects detected by the validation object detection system in the at least one frame of image data;
receiving at the validation system, from the validation object detection system, a list of the classified objects as classified by the validation object detection system in the at least one frame of image data;
comparing via the validation system the list of the objects classified by the test object detection system and the list of the objects classified by the validation object detection system;
determining via the validation system discrepancies between the list of the objects classified by the test object detection system and the list of the objects classified by the validation object detection system; and
reporting via the validation system discrepancies between the list of the objects classified by the test object detection system and the list of the objects classified by the validation object detection system.

8. The method of claim 1, wherein the at least one frame of image data comprises a plurality of frames of image data, and wherein the plurality of frames of image data are synchronized between the validation object detection system and the test object detection system.

9. The method of claim 1, wherein the validation object detection system provides a confidence level for each detected object in the list of the objects detected by the validation object detection system.

10. The method of claim 1, wherein the ground truth data comprises distances to each object in the at least one frame of image data as determined by a distance sensor.

11. A method for automating performance evaluation of a test object detection system, the method comprising:
providing a plurality of frames of image data to the test object detection system;

detecting, via processing of the plurality of frames of image data by an image processor of the test object detection system, objects in the plurality of frames of image data provided to the test object detection system;

receiving at a validation system, from the test object detection system, a list of the objects detected by the test object detection system in the plurality of frames of image data provided to the test object detection system;

providing the plurality of frames of image data to a validation object detection system;

detecting, via the validation object detection system, objects in the plurality of frames of image data provided to the validation object detection system;

receiving at the validation system, from the validation object detection system, a list of the objects detected by the validation object detection system in the plurality of frames of image data provided to the validation object detection system;

synchronizing the plurality of frames of image data between the frames of image data provided to and processed by the image processor of the test object detection system and the frames of image data provided to the validation object detection system;

comparing via the validation system the list of the objects detected by the test object detection system and the list of the objects detected by the validation object detection system;

determining via the validation system discrepancies between the list of the objects detected by the test object detection system and the list of the objects detected by the validation object detection system;

reporting via the validation system the determined discrepancies between the list of the objects detected by the test object detection system and the list of the objects detected by the validation object detection system, wherein reporting the determined discrepancies at least comprises generating a test report via the validation system;

determining, via processing of the plurality of frames of image data by the image processor of the test object detection system, a distance measurement for each detected object;

determining an accuracy of each distance measurement based on ground truth data; and reporting the determined accuracies of the distance measurements for the respective detected objects.

12. The method of claim 11, wherein the validation object detection system comprises a neural network.

13. The method of claim 11, wherein the validation object detection system comprises a plurality of neural networks.

14. The method of claim 13, wherein each of the plurality of neural networks is trained on different training data.

15. The method of claim 14, wherein at least one of the plurality of neural networks is trained on training data that matches an aspect of the plurality of frames of image data, wherein the aspect comprises one selected from the group consisting of (i) a vehicle type, (ii) road conditions and (iii) weather conditions.

16. A method for automating performance evaluation of a test object detection system, the method comprising:

providing at least one frame of image data to the test object detection system;

detecting, via processing of the at least one frame of image data by an image processor of the test object detection system, objects in the at least one frame of image data provided to the test object detection system;

receiving at a validation system, from the test object detection system, a list of the objects detected by the test object detection system in the at least one frame of image data provided to the test object detection system;

providing the at least one frame of image data to a validation object detection system;

detecting, via the validation object detection system, objects in the at least one frame of image data provided to the validation object detection system;

receiving at the validation system, from the validation object detection system, a list of the objects detected by the validation object detection system in the at least one frame of image data provided to the validation object detection system;

wherein the validation object detection system provides a confidence level for each detected object in the list of the objects detected by the validation object detection system;

comparing via the validation system the list of the objects detected by the test object detection system and the list of the objects detected by the validation object detection system;

determining via the validation system discrepancies between the list of the objects detected by the test object detection system and the list of the objects detected by the validation object detection system;

determining, via processing of the at least one frame of image data by the image processor of the test object detection system, a distance measurement for each detected object;

determining an accuracy of each distance measurement based on a predetermined distance to the respective detected object; and reporting via the validation system (i) the determined discrepancies between the list of the objects detected by the test object detection system and the list of the objects detected by the validation object detection system and (ii) the determined accuracies of distance measurements, wherein reporting the determined discrepancies comprises generating a test report via the validation system.

17. The method of claim 16, wherein the validation object detection system comprises a neural network.

18. The method of claim 16, wherein the validation object detection system comprises a plurality of neural networks.

19. The method of claim 18, wherein each of the plurality of neural networks is trained on different training data.

20. The method of claim 19, wherein at least one of the plurality of neural networks is trained on training data that matches an aspect of the at least one frame of image data, wherein the aspect comprises one selected from the group consisting of (i) a vehicle type, (ii) road conditions and (iii) weather conditions.

21. The method of claim 16, wherein the predetermined distance to each object in the at least one frame of image data is determined by a distance sensor.

\* \* \* \* \*